(12) United States Patent
Pawar et al.

(10) Patent No.: US 9,871,358 B2
(45) Date of Patent: Jan. 16, 2018

(54) ELECTRICAL SWITCHGEAR SYSTEM

(71) Applicant: ABB Schweiz AG, Baden (CH)

(72) Inventors: Rahul Pawar, Lake Mary, FL (US); Rob S Karnbach, Lake Mary, FL (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 14/610,767

(22) Filed: Jan. 30, 2015

(65) Prior Publication Data

US 2016/0226228 A1 Aug. 4, 2016

(51) Int. Cl.
*H02B 1/56* (2006.01)
*H02B 1/26* (2006.01)
*H02B 13/02* (2006.01)

(52) U.S. Cl.
CPC .......... *H02B 1/56* (2013.01); *H02B 1/26* (2013.01); *H02B 1/565* (2013.01); *H02B 13/02* (2013.01)

(58) Field of Classification Search
CPC .......... H05K 7/20909; H05K 7/20918; H05K 7/20127; H05K 7/20136; H05K 7/20863; H05K 1/0201; H02B 1/565; H02B 1/56; H02B 1/26; H01F 27/08; H01F 27/085; H02G 5/10; H01G 2/08; H01C 1/08; H04Q 2201/06; G11B 33/142; F24F 13/08; F21V 29/02; F21V 29/40
USPC .................. 361/676–678, 688–695
See application file for complete search history.

(56) References Cited

U.S. PATENT DOCUMENTS

| | | | |
|---|---|---|---|
| 3,949,656 A * | 4/1976 | Lohmann | F24F 13/075 454/316 |
| 4,677,904 A * | 7/1987 | Natsumeda | F15D 1/08 454/266 |
| 4,682,453 A | 7/1987 | Holmgren | |
| 4,907,645 A * | 3/1990 | Dumas | B61C 5/02 105/59 |
| 5,077,601 A * | 12/1991 | Hatada | H01L 23/467 165/80.3 |
| 5,107,398 A * | 4/1992 | Bailey | G06F 1/20 165/104.33 |

(Continued)

FOREIGN PATENT DOCUMENTS

| | | |
|---|---|---|
| DE | 8915141 U1 | 2/1990 |
| DE | 29823349 U1 | 6/1999 |
| WO | 2014005740 A1 | 1/2014 |

OTHER PUBLICATIONS

International Search Report and Written Opinion, PCT/IB2016/000323, ABB Technology Ltd., Aug. 11, 2016, pp. 8.

*Primary Examiner* — Zachary M Pape
*Assistant Examiner* — Amir Jalali
(74) *Attorney, Agent, or Firm* — Taft Stetinius & Hollister LLP

(57) ABSTRACT

A unique electrical switchgear system may include a circuit breaker compartment having a compartment wall. The electrical switchgear system may also include a tapered floor pan mounted on the compartment wall. The floor pan may have two side walls disposed oblique to each other; a back wall; and a top wall coupled to the side walls and defining a discharge opening adjacent to the back wall. The two side walls, the top wall and the compartment wall may form a tunnel for channeling cooling air in a first direction. The back wall may be operative to redirect the cooling air in a second direction different from the first direction for discharging the cooling air from the discharge opening.

20 Claims, 2 Drawing Sheets

(56) References Cited

U.S. PATENT DOCUMENTS

| | | | | |
|---|---|---|---|---|
| 5,563,768 A * | 10/1996 | Perdue | | H01L 23/467 165/80.3 |
| 5,592,363 A * | 1/1997 | Atarashi | | H01L 23/467 165/185 |
| 5,957,194 A * | 9/1999 | Azar | | F28F 3/02 165/185 |
| 6,031,720 A * | 2/2000 | Crane, Jr. | | H01L 23/467 257/E23.099 |
| 6,222,729 B1 * | 4/2001 | Yoshikawa | | H05K 7/20154 174/16.1 |
| 6,236,565 B1 * | 5/2001 | Gordon | | H01L 23/467 174/16.1 |
| 6,442,024 B1 * | 8/2002 | Shih | | G06F 1/20 165/121 |
| 6,462,948 B1 * | 10/2002 | Leija | | H05K 7/20727 165/104.33 |
| 6,525,936 B2 * | 2/2003 | Beitelmal | | H05K 7/20727 165/122 |
| 7,167,363 B1 * | 1/2007 | Cushman | | H05K 7/1461 361/690 |
| 7,209,352 B2 * | 4/2007 | Chen | | H05K 7/20727 165/120 |
| 7,345,873 B2 * | 3/2008 | Dey | | G06F 1/20 361/691 |
| 7,361,081 B2 * | 4/2008 | Beitelmal | | H05K 7/20727 361/691 |
| 7,546,715 B2 | 6/2009 | Roen | | |
| 7,586,738 B1 | 9/2009 | Hartzel et al. | | |
| 7,611,402 B2 * | 11/2009 | McClellan | | H05K 7/20154 361/679.48 |
| 7,821,774 B2 | 10/2010 | Josten et al. | | |
| 7,952,847 B2 | 5/2011 | Lu | | |
| 7,952,857 B1 | 5/2011 | Motley et al. | | |
| 7,990,706 B2 * | 8/2011 | Miyahara | | H01L 23/467 165/121 |
| 8,077,459 B2 * | 12/2011 | Zhang | | G06F 1/186 361/694 |
| 8,279,601 B2 * | 10/2012 | Lima | | 361/694 |
| 8,335,081 B2 * | 12/2012 | Weiss | | H05K 7/20163 165/80.3 |
| 8,854,807 B2 * | 10/2014 | Hoffmann | | H05K 7/20909 165/80.3 |
| 9,007,746 B2 * | 4/2015 | Rajvanshi | | H05K 7/20581 165/104.33 |
| 9,022,098 B2 * | 5/2015 | Hofmann | | F28D 1/06 165/121 |
| 2003/0155106 A1 * | 8/2003 | Malone | | F28F 3/02 165/121 |
| 2006/0034051 A1 * | 2/2006 | Wang | | H05K 7/20209 361/696 |
| 2007/0023166 A1 * | 2/2007 | Hung | | H01L 23/467 165/80.3 |
| 2009/0244828 A1 * | 10/2009 | Engert | | G06F 1/20 361/679.47 |
| 2011/0014861 A1 * | 1/2011 | Tsai | | G06F 1/20 454/184 |
| 2014/0160636 A1 | 6/2014 | Rajvanshi et al. | | |

* cited by examiner

ELECTRICAL SWITCHGEAR SYSTEM

FIELD OF THE INVENTION

The present disclosure relates to electrical systems, and more particularly to electrical switchgear and floor pans for electrical switchgear systems.

BACKGROUND

Electrical switchgear systems remain an area of interest. Some existing systems have various shortcomings, drawbacks and disadvantages relative to certain applications. For example, in some electrical switchgear systems, electrical phase components, e.g., in a circuit breaker compartment, may not receive as much cooling air flow as desired for higher power applications. Accordingly, there remains a need for further contributions in this area of technology.

SUMMARY

Embodiments of the present application include a unique electrical switchgear system. The electrical switchgear system may include a circuit breaker compartment having a compartment wall. The electrical switchgear system may also include a tapered floor pan mounted on the compartment wall. The floor pan may have two side walls disposed oblique to each other; a back wall; and a top wall coupled to the side walls and defining a discharge opening adjacent to the back wall. The two side walls, the top wall and the compartment wall may form a tunnel for channeling cooling air in a first direction. The back wall may be operative to redirect the cooling air in a second direction different from the first direction for discharging the cooling air from the discharge opening.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
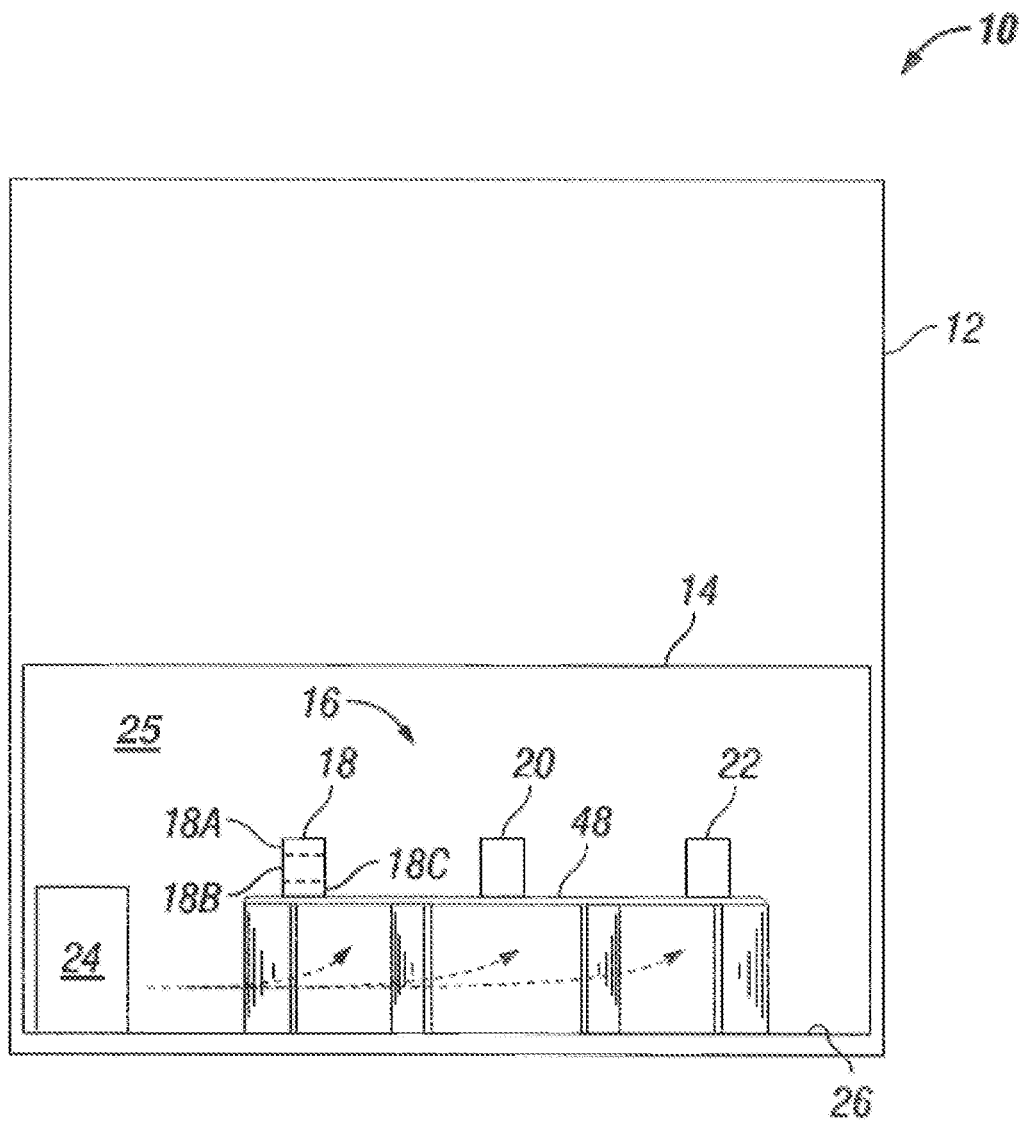
FIG. 1 schematically depicts some aspects of a non-limiting electrical switchgear system.

For purposes of promoting an understanding of the principles of the Electrical Switchgear System, reference will now be made to the examples illustrated in the drawings, and specific language will be used to describe the same. It will nonetheless be understood that no limitation of the scope of the invention is intended by the illustration and description of certain examples of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring to FIG. 1, some aspects of a non-limiting example of an electrical switchgear system 10 in accordance with an embodiment of the present invention are schematically depicted. System 10 includes an enclosure 12, such as a metallic enclosure; a circuit breaker compartment 14, a floor pan 16, a plurality of electrical phase components 18, 20 and 22, e.g., components associated with each phase of a three-phase system, and a fan 24. For example, electrical phase component 18 may be associated with an A-phase of a three-phase system, whereas electrical phase components 20 and 22 may be associated with the B and C phases of the three-phase electrical system. Floor pan 16, electrical phase components 18, 20 and 22 and fan 24 are disposed within circuit breaker compartment 14. Electrical switchgear system 10 may include other compartments in addition to circuit breaker compartment 14, e.g., a main bus compartment, a cable compartment, a low voltage compartment, etc., in accordance with the needs of the application.

Each of the electrical phase components 18, 20 and 22 may take one or more forms, and may be or may include a bus bar 18A, a bus bar joint 18B and/or all or part of a circuit breaker, e.g., a circuit breaker contact arm 18C. Each of electrical phase components 18, 20 and 22 are operative to deliver and/or selectively interrupt the flow of power out of electrical switchgear system 10. In one form, electrical phase components 18, 20 and 22 are mounted on a mounting plate 25 of circuit breaker compartment 14, e.g., a wall, such as a back wall of circuit breaker compartment 14. In other embodiments, one or more of electrical phase components 18, 20 and 22 may be mounted on another structure and disposed in proximity to floor pan 16. In one form, floor pan 16 is mounted on a wall of circuit breaker compartment 14, e.g., a bottom wall, such as a floor structure or floor wall, referred to herein as wall 26. In other embodiments, floor pan 16 may be mounted on any other wall or other surface of circuit breaker compartment 14. Fan 24 is operative to deliver cooling air into floor pan 16 for cooling electrical phase components 18, 20 and 22.

Figure 2:
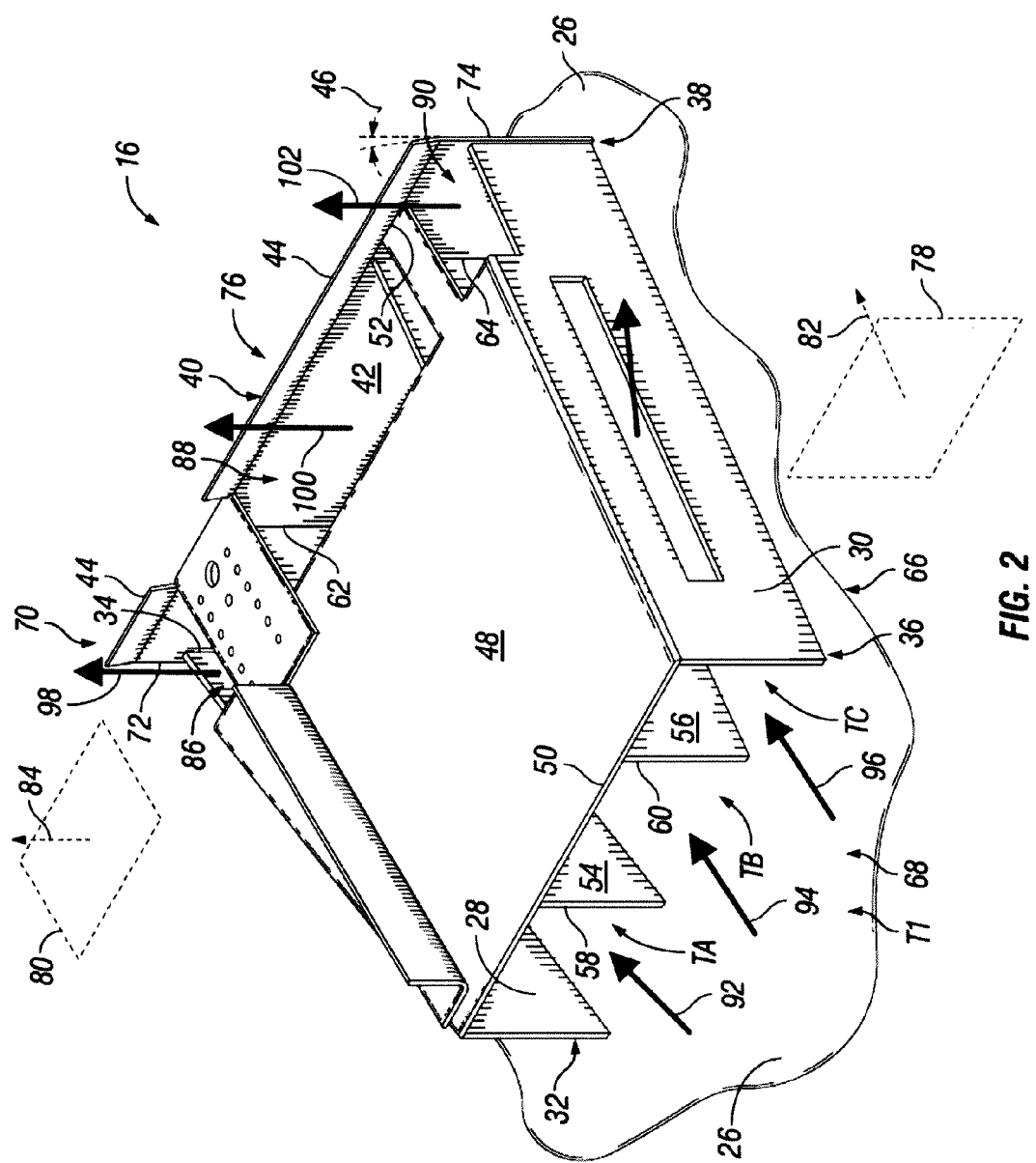
FIG. 2 schematically depicts some aspects of a non-limiting floor pan for an electrical switchgear system.

Referring to FIG. 2, some aspects of a non-limiting example of floor pan 16 in accordance with an embodiment of the present invention are depicted. Floor pan 16 includes side walls 28 and 30 having respective proximal ends 32, 36 and distal ends 34, 38; a back wall 40 having a main portion 42 and an extension 44 inclined at an angle 46 relative to main portion 42; a top plate 48 having a proximal end 50 and a distal end 52; and deflectors 54 and 56 having respective proximal ends 58, 60 and distal ends 62, 64.

Side walls 28 and 30 are spaced apart from each other. In one form, side walls 28 and 30 are coupled to compartment wall 26. In other embodiments, side walls 28 and 30 may be coupled to other structure in addition to or in place of compartment wall 26. Proximal ends 32, 36 and 50 of respective side walls 28, 30 and top plate 48 define a proximal end 66 of floor pan 16. Proximal ends 32, 36 of respective side walls 28, 30, in conjunction with proximal end 50 of top plate 48 and compartment wall 26, define therebetween a cooling air intake 68, e.g., an intake plane of floor pan 16 for receiving cooling air for cooling at least parts of electrical phase components 18, 20 and 22. A distal end 70 of floor pan 16 is defined by distal ends 34, 38 and 52 of respective side walls 28, 30 and top plate 48, as well as back wall 40. Cooling air flows generally through floor pan 16 from proximal end 66 toward distal end 70, before being redirected by back wall 40 and back wall extension 44 through cooling air discharge openings, discussed below.

Ends 72 and 74 of back wall 40 extend between side walls 28 and 30 and are disposed at respective distal ends 34 and 38. Back wall main portion 40 extends from compartment wall 26 to top plate 48, whereas extension 44 of back wall 40 extends beyond or above top plate 48, i.e., extends outward from back wall main portion 42 in a direction away from compartment wall 26. Top plate 48 is spaced apart from compartment wall 26. In one form, top plate 48 is parallel to compartment wall 26. In other embodiments, top plate 48 may not be parallel to compartment wall 26. In one form, top plate 48 is coupled to side walls 28 and 30. In some embodiments, top plate 48 may be coupled to one or more structures in addition to side walls 28 and 30, e.g., back wall 40.

In one form, floor pan 16 is a tapered structure, because side walls 28 and 30 are disposed oblique to each other—that is, they are not parallel to each other. In one form, proximal ends 32 and 36 of respective side walls 28 and 30 are closer to each other than distal ends 34 and 38 of respective side walls 28 and 30, rendering floor pan 16 more narrow at proximal end 66 than at distal end 70. In other embodiments, proximal end 66 may have the same width as distal end 70, or distal end 70 may be wider than proximal end 66.

Deflectors 54 and 56 are disposed between side walls 28 and 30. In one form, deflector 54 is parallel to side wall 28 and is oblique to deflector 56 and side wall 30, whereas deflector 56 is parallel to side wall 30 and is oblique to deflector 54 and side wall 30. In other embodiments, other angular relationships may be employed. Deflectors 54 and 56 are operative to divide the cooling air flowstream supplied to floor pan 16 to obtain a more even distribution of cooling air flow as between electrical phase components 18, 20 and 22 than in a floor pan similar to floor pan 16, but lacking deflectors 54 and 56. Proximal ends 58 and 60 of deflectors 54 and 56, respectively, are disposed at or adjacent to intake 68, and extend to respective distal ends 62 and 64. Distal ends 62 and 64 of deflectors 54 and 56, respectively, abut back wall 40. Deflectors 54 and 56 subdivide a tunnel T1 formed between side walls 28 and 30, top plate 48, a bottom wall and back wall 40 into three tunnel portions TA, TB and TC for channeling cooling air toward electrical phase components 18, 20 and 22 respectively. In other embodiments, a greater or lesser number of tunnels may be formed by a greater or lesser number of deflectors. In one form the bottom wall forming apportion of the structure defining the tunnel T1 is defined by the compartment wall 26.

Top plate 48 defines a cooling air discharge opening 76 that is adjacent to back wall 40. Cooling air discharge opening 76 is disposed at an angle, relative to intake 68. In one form cooling air discharge opening 76 is perpendicular to intake 68. As an illustration, a plane 78 depicts the plane of intake 68, whereas a plane 80 depicts the plane of cooling air discharge opening 76. Lines 82 and 84 are perpendicular to planes 78 and 80, respectively, and are perpendicular to each other. Line 84 is parallel to plane 78, and line 82 is parallel to plain 80. In other embodiments, any suitable angular relationship between the planes of intake 60 and cooling air discharge opening 76 may be employed.

Deflectors 54 and 56 are operative to subdivide cooling air discharge opening 76 into a plurality of discharge opening portions 86, 88 and 90. In other embodiments, a greater or lesser number of deflectors may be employed to subdivide cooling air discharge opening 76 into a greater or lesser number of discharge opening portions, Electrical phase components 18, 20 and 22 overhang, at least partially, discharge openings 86, 88 and 90. That is, at least part of each of electrical phase components 18, 20 and 22 is disposed over respective discharge openings 86, 88 and 90 and positioned so as to be at least partially impinged by or immersed in the cooling air flow discharged from respective discharge openings 86, 88 and 90. Discharge openings 86, 88 and 90 allow cooling air received from intake 68 to flow onto and/or adjacent electrical phase components 18, 20 and 22, respectively, for extracting heat from electrical phase components 18, 20 and 22. The angle of inclination of extension 44 of back wall 40 redirects cooling flow to electrical phase components 18, 20 and 22, e.g., air that would otherwise flow to arbitrary locations or within arbitrary circulation patterns within breaker compartment 14. In one form, angle of inclination 46 of extension 44 is approximately 5°. In other embodiments, angle of inclination 46 of extension 44 may vary with the needs of the application, e.g., as needed to ensure adequate cooling air flow to electrical phase components 18, 20 and 22, In one form, the height of extension 44 extending from main portion 42 of back wall 40 is approximately 1.0inch, and the ratio of the height of extension 44 to the height of back wall 40 is approximately 0.12. In other embodiments, the height of extension 44 and the relative heights of extension 44 and back wall 40 may vary with the needs of the application, e.g., as needed to ensure adequate cooling air flow to electrical phase components 18, 20 and 22.

During operation, the intake cooling air delivered by fan 24 is subdivided into three flowstreams after it enters intake 68 by deflectors 54 and 56. The airstreams are indicated by arrows 92, 94 and 96. In other embodiments, the cooling air may be subdivided into a greater or lesser number of flowstreams, e.g., by a greater or lesser number of deflectors. This cooling air is directed by each of tunnels TA, TB and TC toward respective discharge openings 86, 88 and 90. Back wall 40 and extension 44, and discharge openings 86, 88 and 90 subsequently redirect the cooling air from the initial direction (the direction illustrated by arrows 92, 94 and 96) as it passes through intake 68 and tunnels TA, TB and TC. Each of the discharge cooling air flowstreams, indicated by arrows 98, 100 and 102, is directed from respective discharge openings 86, 88 and 90 in the directions generally indicated by arrows 98, 100 and 102, which are disposed approximately 90° to the angles of respective arrows 92, 94 and 96. After departing discharge openings 86, 88 and 90, discharged cooling air flowstreams 98, 100 and 102 impinge upon electrical phase components 18, 20 and 22, respectively, and provide convective cooling to electrical phase components 18, 20 and 22. It will be understood that, although a fan is used to provide cooling flow in the depicted embodiment, in other embodiments, other means of providing cooling flow may be employed, including natural convention, e.g., such as via the use of a chimney. In addition, it will be understood that other angular relationships between the directions of the intake cooling air flowstreams 92, 94 and 96 and discharge cooling air flowstreams 98, 100 and 102 may vary with the needs of the application.

Embodiments of the present invention include an electrical switchgear system, comprising: a circuit breaker compartment; a floor pan located within the compartment and having two side walls disposed oblique to each other; a back wall; and a top wall coupled to the side walls and defining a discharge opening adjacent to the back wall; and wherein the two side walls, the top wall and a bottom wall form a tunnel for channeling cooling air in a first direction, and wherein the back wall is operative to redirect the cooling air in a second direction different from the first direction for discharging the cooling air from the discharge opening.

In a refinement the circuit breaker compartment comprises a compartment wall; and, the compartment wall defines the bottom wall.

In another refinement, the back wall is disposed at a distal end of the floor pan, and the floor pan includes an intake disposed at a proximal end of the floor pan for receiving the cooling air into the tunnel, the intake being formed between the two side walls, the top wall and the compartment wall.

In another refinement, the electrical switchgear system further comprises a deflector wall disposed between the two side walls and extending between the intake and the back wall, and extending between the bottom wall and the top wall, wherein the deflector wall is operative to subdivide the tunnel into at least two tunnel portions, and to subdivide discharge opening into at least two discharge opening portions.

In yet another refinement, the deflector wall is oblique to one or both of the first and second side walls.

In still another refinement, the electrical switchgear system further comprises a first deflector wall and a second deflector wall disposed between the two side walls, each of the deflector walls extending between the intake and the back wall, and extending between the bottom wall and the top wall, wherein the deflector walls subdivide the tunnel into at least three tunnel portions, and subdivide the discharge opening into at least three discharge opening portions.

In yet still another refinement, the first and second deflector walls are each oblique to one or both of the first and second side walls.

In a further refinement, the electrical switchgear system further comprises a fan operative to supply the cooling air to the intake.

In a further refinement the back wall is disposed at a distal end of the floor pan; the floor pan includes an intake disposed at a proximal end of the floor pan for receiving the cooling air into the tunnel, the intake being formed between the two side walls, the top wall and the bottom wall; further comprising a first deflector wall and a second deflector wall disposed between the two side walls, each of the deflector walls extending between the intake and the back wall, and extending between the bottom wall and the top wall, wherein the deflector walls subdivide the tunnel into at least three tunnel portions and subdivide the discharge opening into at least three discharge opening portions; the first and second deflector walls are each oblique to one or both of the first and second side walls; and further comprising a fan operative to supply the cooling air to the intake.

Embodiments of the present invention include an electrical switchgear system, comprising: a circuit breaker compartment having a compartment wall; a plurality of electrical phase components disposed within the circuit breaker compartment; and a tapered structure coupled to the compartment wall and operative to distribute cooling air to the electrical phase components, the structure comprising: first and second side walls spaced apart from each other and arranged oblique to each other; an intake for receiving cooling air defined between proximal ends of the first and second sidewalls; a back wall having first and second ends disposed at respective distal ends of the first and second side walls; and a top plate spaced apart from the compartment wall and coupled to the first and second sidewalls, the top plate including a cooling air discharge opening adjacent to the back wall and disposed at an angle relative to the intake.

In a refinement, the first and second side walls are coupled to the compartment wall.

In another refinement, the circuit breaker compartment includes a mounting plate, and the electrical phase components are mounted on the mounting plate.

In yet another refinement, each of the plurality of electrical phase components overhang, at least in part, the discharge opening; and the discharge opening is operative to discharge cooling air onto each of the plurality of electrical phase components.

In yet still another embodiment, the first and second side walls, the compartment wall, the back wall, and the top plate form a tunnel for channeling cooling air from the intake at a first angle toward the back wall and out the discharge opening at a second angle different from the first angle.

In a further refinement, the electrical switchgear system further comprises a plurality of deflector walls disposed between the first side wall and the second side wall, each deflector wall extending from a proximal end adjacent the intake to a distal end adjacent the back wall, and extending from the compartment wall to the top plate, wherein the deflector walls are operative to subdivide the tunnel into at least three tunnel portions.

In a yet further refinement, the deflector walls to subdivide the discharge opening into at least three discharge opening portions.

In a still further refinement, the discharge opening is perpendicular to the intake.

In a yet still further refinement, the back wall includes a first portion extending from the compartment wall to the top wall; and an extension extending from the first portion past the top wall, wherein the extension is inclined relative to the first portion.

In a further refinement the plurality of electrical phase components includes at least one of a bus bar, a bus bar joint, and a circuit breaker contact arm; the first and second side walls are coupled to the compartment wall; each of the plurality of electrical phase components overhang, at least in part, the discharge opening; and wherein the discharge opening is operative to discharge cooling air to each of the plurality of electrical phase components; the first and second side walls, the compartment wall, the back wall, and the top plate form a tunnel for channeling cooling air from the intake at a first angle toward the back wall and out the discharge opening at a second angle different from the first angle; further comprising a plurality of deflector walls disposed between the first side wall and the second side wall, each deflector wall extending from a proximal end adjacent the intake to a distal end adjacent the back wall, and extending from the compartment wall to the top plate, wherein the deflector walls subdivide the tunnel into at least three tunnel portions; the deflector walls subdivide the discharge opening into at least three discharge opening portions; the discharge opening is perpendicular to the intake; and further comprising a fan operative to supply the cooling air to the intake.

Embodiments of the present invention include an electrical switchgear system, comprising: a breaker compartment having a floor therein for mounting a floor pan; a tapered floor pan mounted on the floor, the floor pan including a first wall; a second wall spaced apart from and oblique to the first wall; first and second deflectors disposed between the first wall and the second wall; an end wall coupled to the first wall and the second wall; and a top plate spaced apart from the floor and coupled to the first wall and the second wall, wherein proximal ends of the first wall, the second wall, and the top plate, in conjunction with the floor form an intake for receiving cooling air into the floor pan; wherein the top plate defines a cooling air discharge opening adjacent to the end wall and perpendicular to the intake for discharging the cooling air; and wherein the first and second deflectors subdivide the discharge opening into a plurality of discharge opening portions; a first electrical phase component partially overhanging a first of the discharge opening portions; a second electrical phase component partially overhanging a second of the discharge opening portions; and a third electrical phase component partially overhanging a third of the discharge opening portions; wherein the first wall, the second wall, the first deflector, the second deflector, the floor and the top plate form a plurality of tunnels extending from the intake in a direction perpendicular to the discharge opening for delivering cooling air to the plurality of discharge opening portions for convective cooling of the first, second and third electrical phase components.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. An electrical switchgear system, comprising:
   a circuit breaker compartment;
   a floor pan located within the compartment and having two side walls disposed oblique to each other; a back wall; and a top wall coupled to the side walls and defining a discharge opening adjacent to the back wall; and
   wherein the two side walls, the top wall and a bottom wall form a tunnel for channeling cooling air in a first direction, and wherein the back wall includes a portion extending from a distal end of a first sidewall of the two sidewalls to a distal end of a second sidewall of the two sidewalls that blocks passage of cooling air therethrough between the distal end of the first sidewall and the distal end of the second sidewall, wherein the back wall is operative to redirect the cooling air in a second direction different from the first direction for discharging the cooling air from the discharge opening.

2. The electrical switchgear system of claim 1, wherein the circuit breaker compartment comprises a compartment wall; and
   wherein the compartment wall defines the bottom wall.

3. The electrical switchgear system of claim 1, wherein the back wall is disposed at a distal end of the floor pan; and
   wherein the floor pan includes an intake disposed at a proximal end of the floor pan for receiving the cooling air into the tunnel, the intake being formed between the two side walls, the top wall and the bottom wall.

4. The electrical switchgear system of claim 3, further comprising a deflector wall disposed between the two side walls and extending between the intake and the back wall, and extending between the bottom wall and the top wall; and
wherein the deflector wall is operative to subdivide the tunnel into at least two tunnel portions, and to subdivide the discharge opening into at least two discharge opening portions.

5. The electrical switchgear system of claim 4, wherein the deflector wall is oblique to one or both of the first and second side walls.

6. The electrical switchgear system of claim 3, further comprising a first deflector wall and a second deflector wall disposed between the two side walls, each of the deflector walls extending between the intake and the back wall, and extending between the bottom wall and the top wall, wherein the deflector walls subdivide the tunnel into at least three tunnel portions and subdivide the discharge opening into at least three discharge opening portions.

7. The electrical switchgear system of claim 6, wherein the first and second deflector walls are each oblique to one or both of the first and second side walls.

8. The electrical switchgear system of claim 3, further comprising fan operative to supply the cooling air to the intake.

9. The electrical switchgear system of claim 2, wherein the back wall is disposed at a distal end of the floor pan;
   wherein the floor pan includes an intake disposed at a proximal end of the floor pan for receiving the cooling air into the tunnel, the intake being formed between the two side walls, the top wall and the bottom wall;
   further comprising a first deflector wall and a second deflector wall disposed between the two side walls, each of the deflector walls extending between the intake and the back wall, and extending between the bottom wall and the top wall, wherein the deflector walls subdivide the tunnel into at least three tunnel portions and subdivide the discharge opening into at least three discharge opening portions;
   wherein the first and second deflector walls are each oblique to one or both of the first and second side walls; and
   further comprising a fan operative to supply the cooling air to the intake.

10. An electrical switchgear system, comprising:
    a circuit breaker compartment having a compartment wall;
    a plurality of electrical phase components disposed within the circuit breaker compartment; and
    a tapered structure coupled to the compartment wall and operative to distribute cooling air to the electrical phase components, the tapered structure comprising:
      first and second side walls spaced apart from each other and disposed oblique to each other;
      an intake for receiving the cooling air defined between proximal ends of the first arid second sidewalls;
      a back wall having first and second ends disposed at respective distal ends of the first and second side walls, the back wall extending from the distal end of the first side wall to the distal end of the second side wall to block passage of cooling air between the first and second ends of the back wall therethrough past the respective distal ends of the first and second side; and
      a top plate spaced apart from the compartment wall and coupled to the first and second sidewalls, the top plate including a cooling air discharge opening adjacent to the back wall and disposed at an angle relative to the intake, wherein the back wall is constructed to redirect the cooling air received from the air intake to the cooling air discharge opening of the top plate.

11. The electrical switchgear system of claim 10, wherein the first and second side walls are coupled to the compartment wall.

12. The electrical switchgear system of claim 10 wherein the circuit breaker compartment includes a mounting plate, wherein the electrical phase components are mounted on the mounting plate.

13. The electrical switchgear system of claim 10, wherein each of the plurality of electrical phase components overhang, at least in part, the cooling air discharge opening; and wherein the cooling air discharge opening is operative to discharge the cooling air onto each of the plurality of electrical phase components.

14. The electrical switchgear system of claim 10, wherein the first and second side walls, the compartment wall, the back wall, and the top plate form a tunnel for channeling the cooling air from the intake at a first angle toward the back wall and out the cooling air discharge opening at a second angle different from the first angle.

15. The electrical switchgear system of claim 14, further comprising a plurality of deflector walls disposed between the first side wall and the second side wall each of the deflector walls extending from a proximal end adjacent the intake to a distal end adjacent the back wall, and extending from the compartment wall to the top plate, wherein the deflector walls subdivide the tunnel into at least three tunnel portions.

16. The electrical switchgear system of claim 15, wherein the deflector walls subdivide the cooling air discharge opening into at least three discharge opening portions.

17. The electrical switchgear system of claim 10, wherein the cooling air discharge opening is perpendicular to the intake.

18. The electrical switchgear system of claim 10, wherein the back wall includes a first portion extending from the compartment wall to the top wall; and an extension extending from the first portion past the top wall, wherein the extension is inclined relative to the first portion.

19. The electrical switchgear system of claim 10, wherein the plurality of electrical phase components includes at least one of a bus bar, a bus bar joint, and a circuit breaker contact arm;
    wherein the first and second side walls are coupled to the compartment wall;
    wherein each of the plurality of electrical phase components overhang, at least in part, the cooling air discharge opening; and
    wherein the cooling air discharge opening is operative to discharge the cooling air to each of the plurality of electrical phase components; wherein the first and second side walls, the compartment wall, the back wall, and the top plate form a tunnel for channeling the cooling air from the intake at a first angle toward the back wall and out the cooling air discharge opening at a second angle different from the first angle;
    further comprising a plurality of deflector walls disposed between the first side wall and the second side wall, each of the deflector walls extending from a proximal end adjacent the intake to a distal end adjacent the back wall, and extending from the compartment wall to the top plate, wherein the deflector walls subdivide the tunnel into at least three tunnel portions;
    wherein the deflector walls subdivide the cooling air discharge opening into at least three discharge opening portions;
    wherein the cooling air discharge opening is perpendicular to the intake; and
    further comprising a fan operative to supply the cooling air to the intake.

20. An electrical switchgear system, comprising;
    a circuit breaker compartment having a floor therein for mounting a floor pan;
    a tapered floor pan mounted on the floor, the floor pan including a first wall; a second wall spaced apart from and oblique to the first wall; first and second deflectors disposed between the first wall and the second wall; an end wall coupled to and extending from the first wall to the second wall and oriented to prohibit passage of cooling air between the first wall and the second wall therethrough; and a top plate spaced apart from the floor and coupled to the first wall and the second wall, wherein proximal ends of the first wall, the second wall, and the top plate, in conjunction with the floor form an intake for receiving cooling air into the floor pan; wherein the top plate defines a cooling air discharge opening adjacent to the end wall and perpendicular to the intake for discharging the cooling air; wherein the first and second deflectors subdivide the cooling air discharge opening into a plurality of discharge opening portions; and wherein the end wall is constructed to redirect the cooling air received from the intake to the cooling air discharge opening of the top plate;
    a first electrical phase component partially overhanging a first of the discharge opening portions;
    a second electrical phase component partially overhanging a second of the discharge opening portions;
    a third electrical phase component partially overhanging a third o he discharge opening portions;
    wherein the first wall, the second wall, the first deflector, the second deflector, the floor and the top plate form a plurality of tunnels extending from the intake in a direction perpendicular to the cooling air discharge opening for delivering the cooling air to the plurality of discharge opening portions for convective cooling of the first, second and third electrical phase components.

* * * * *